Feb. 18, 1936.    D. V. MAZZOCCO    2,031,221
REGISTERING APPARATUS
Filed Aug. 13, 1931    6 Sheets-Sheet 3
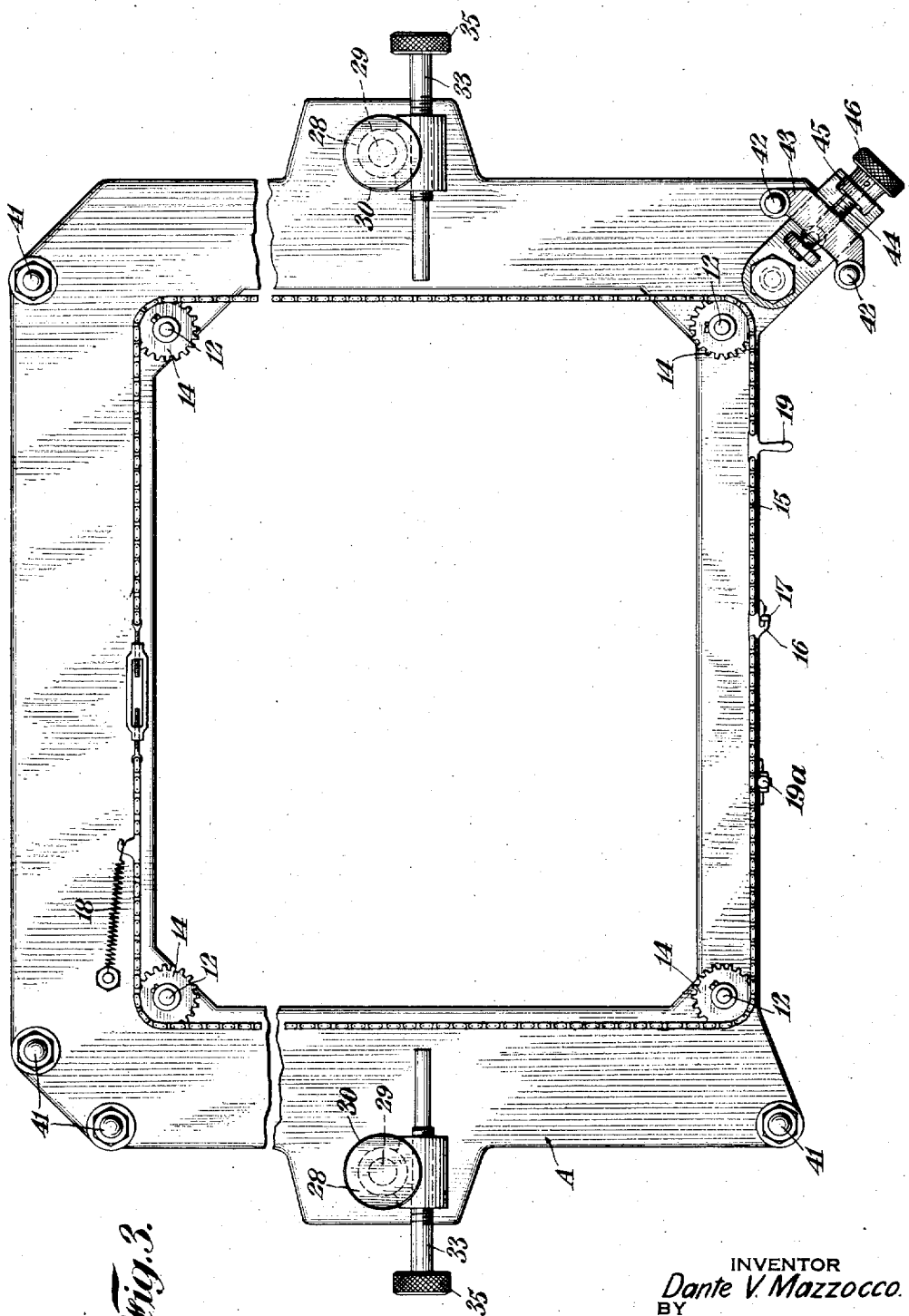
INVENTOR
Dante V. Mazzocco.
BY
Ward, Crosby & Neal
ATTORNEYS

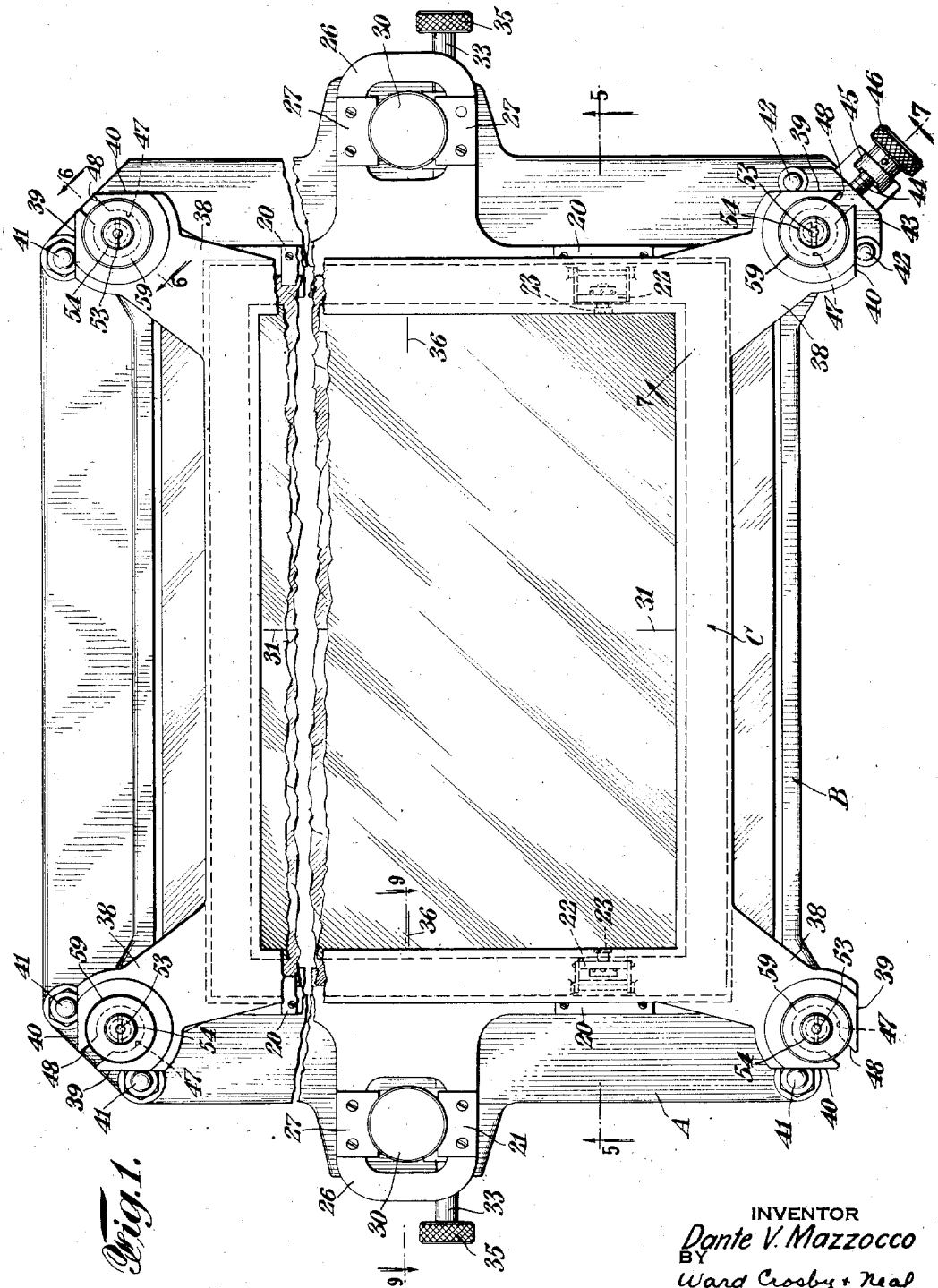

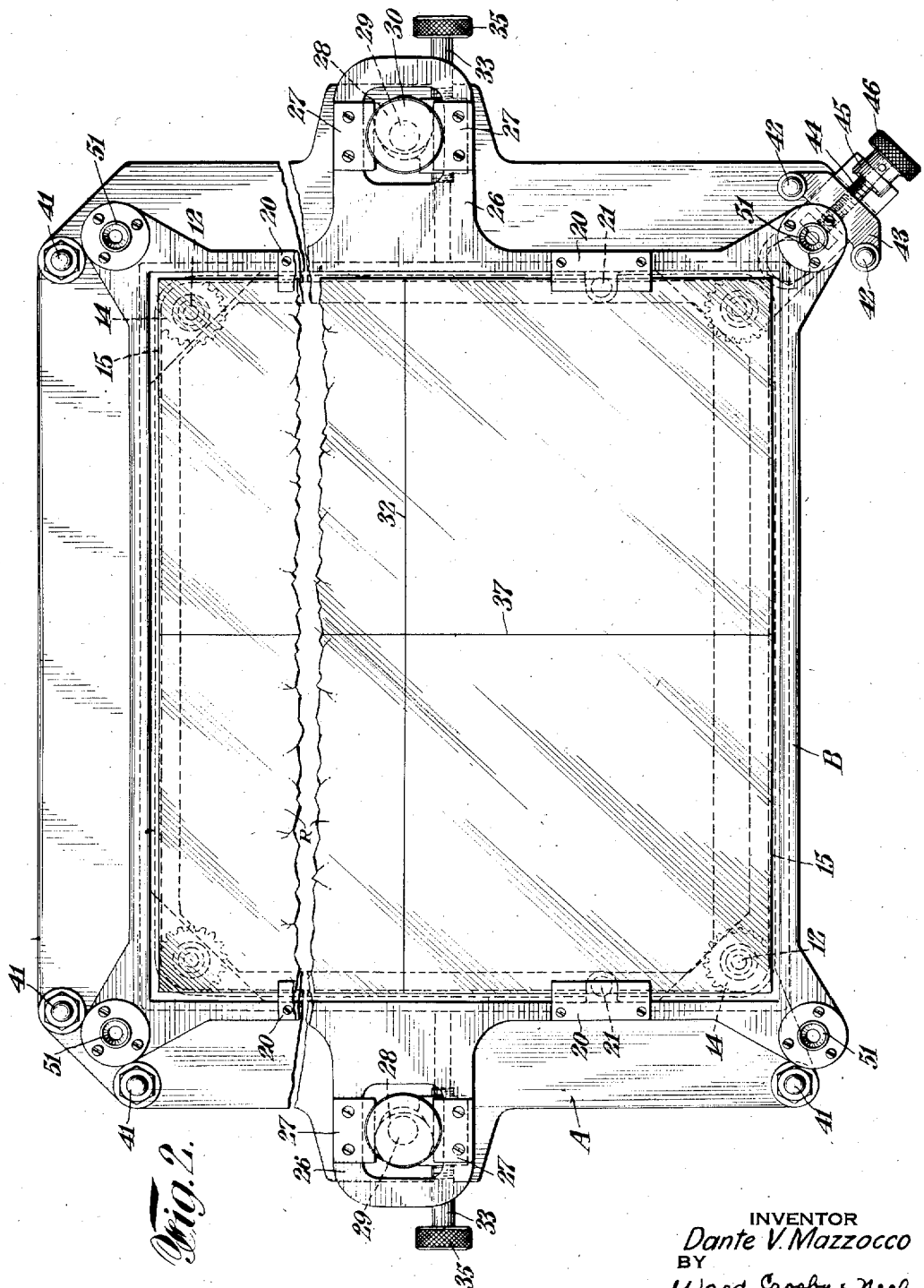

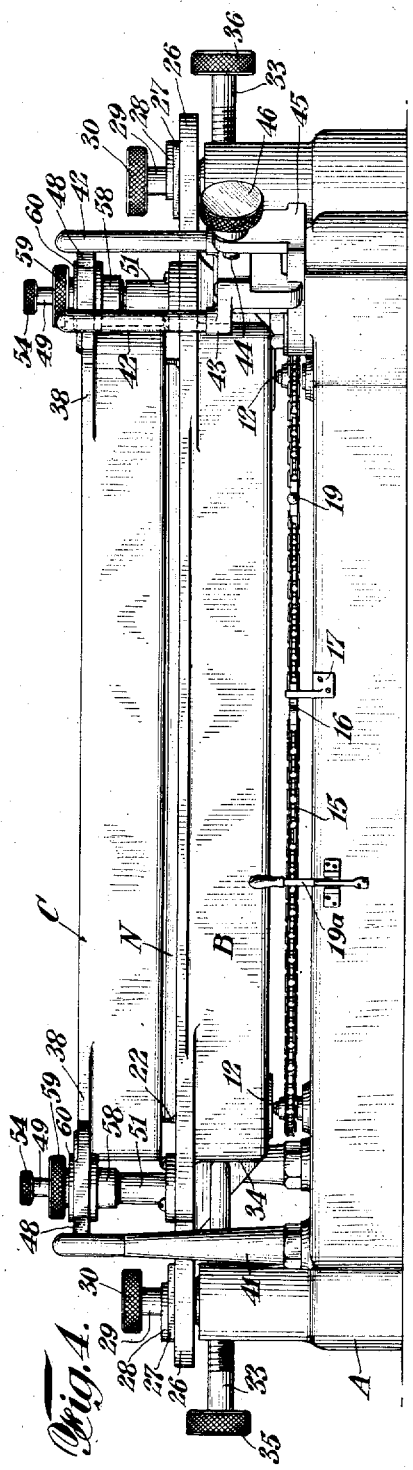
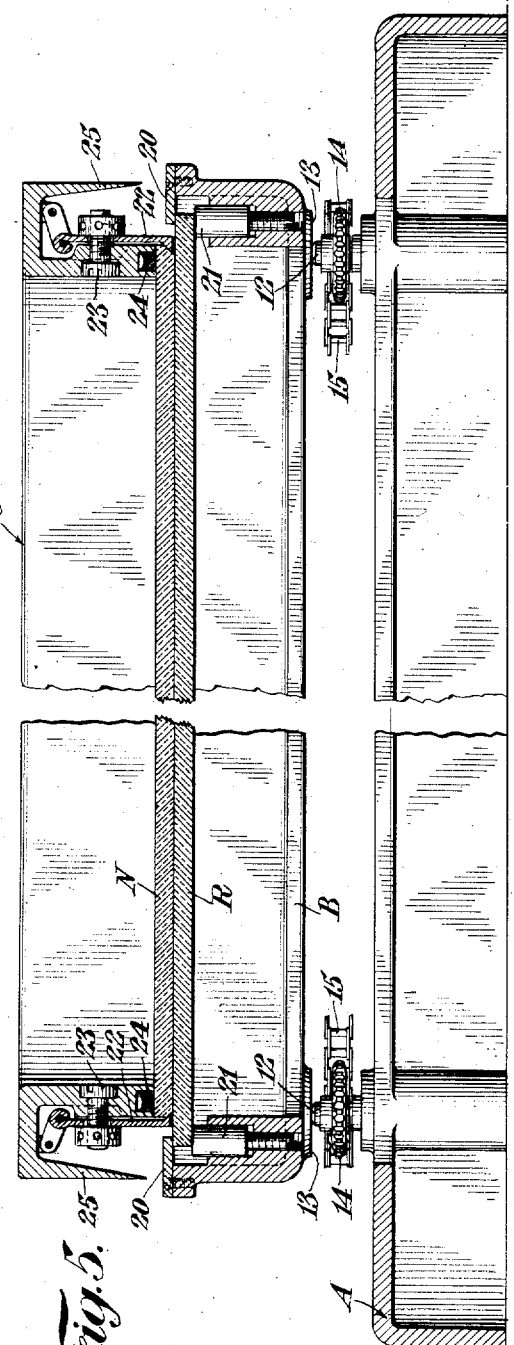

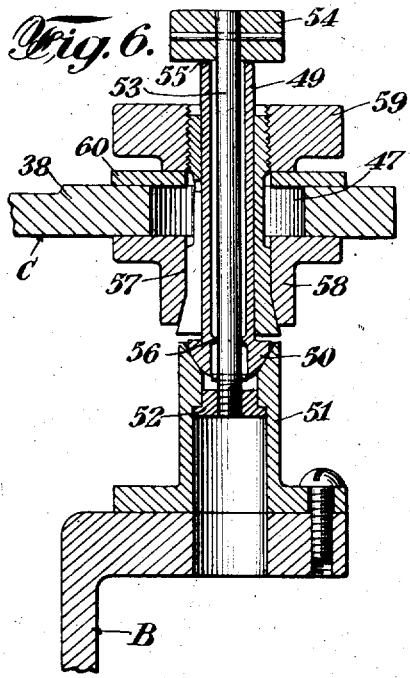
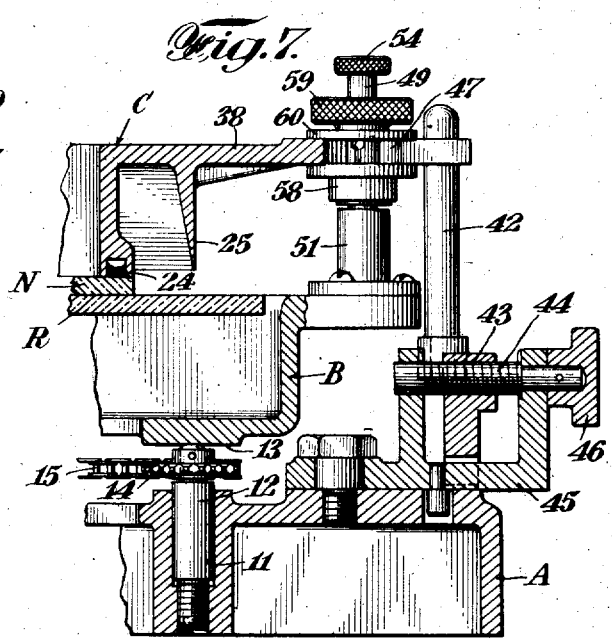
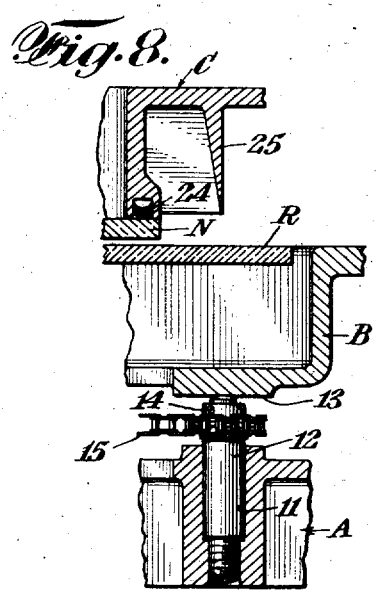
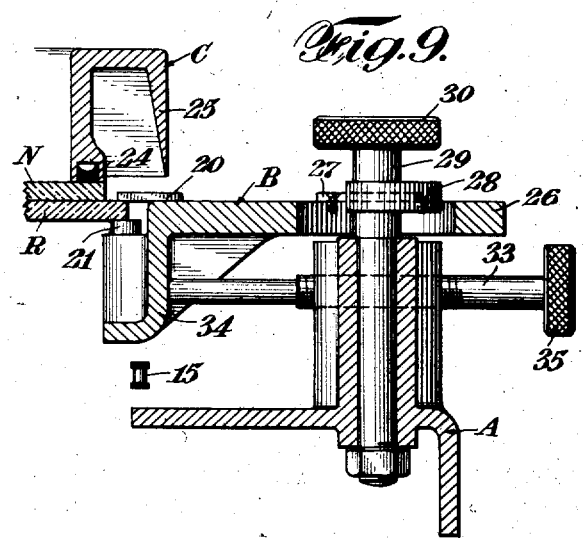

Feb. 18, 1936.   D. V. MAZZOCCO   2,031,221
REGISTERING APPARATUS
Filed Aug. 13, 1931   6 Sheets-Sheet 6

INVENTOR
Dante V. Mazzocco
BY
Ward, Crosby & Neal
ATTORNEYS

Patented Feb. 18, 1936

2,031,221

UNITED STATES PATENT OFFICE 2,031,221

REGISTERING APPARATUS

Dante V. Mazzocco, New York, N. Y., assignor to Eureka Photo Mechanical Equipment, Inc., New York, N. Y., a corporation of New York Application August 13, 1931, Serial No. 556,759

19 Claims. (Cl. 33—184.5)

This invention relates to a registering apparatus used in the photocomposing art.

In the ordinary commercial printing of pictures the impressions are made from large metal plates which usually bear a number of pictures to be printed simultaneously. The photocomposing art has to do with the making of images upon the metal press plate, and the usual method of accomplishing this is to cover the plate with a light sensitive surface, photograph images upon it separately, and then by the use of chemicals, or otherwise, etch them into the metal.

A matter of prime importance is precision in the positioning of the images on the metal plates. This is especially true in multi-color printing where successive impressions from different plates must be placed on the same paper and inaccuracy results in overlapping of the colors, but it is also important in single color printing where only one impression is put on the paper because the sheets are cut by machine and an improper position of the image would result in irregular margins and bad aligning.

The photographing of an image upon the sensitized press plate is accomplished by holding a negative of the image in close proximity to the plate or in actual contact as is the practice, such contact being in certain instances produced by creating a vacuum between the plate and the negative. After the negative and plate have been brought into contact a strong light is passed through the negative until the sensitive surface is properly affected. This is done by means of a photocomposing machine which has a movable frame to hold the negative which may be placed over any desired portion of the press plate. The frame may be moved in two directions over the bed of the press plate by means of a finely calibrated mechanism which is part of the photocomposing mechanism and can thus be exactly positioned over the proper section of the press plate.

The accuracy in locating the images on the press plate requires an exact positioning of the negative with respect to the travel lines of the photocomposing machine. For the latter purpose, the negative frame is usually made detachable from the machine and a separate apparatus is employed to correctly position the negative with respect to the travel lines of the photocomposing machine. It is this separate registering apparatus which is the subject matter of this application.

One of the objects of this invention is the provision of an improved registering apparatus facilitating the registration of a negative, or negatives, with respect to travel lines of a photocomposing machine.

Another object of this invention is the provision of means in such a registering apparatus for moving a registering frame with respect to a negative frame to position means on said negative frame adapted to cooperate with means in the photocomposing machine to cause a negative carried by the negative frame when in position in the photocomposing machine to be properly positioned with respect to the travel lines of the photocomposing machine.

Another object of this invention is the provision of adjustable means on a negative frame and the provision of a movable and adjustable registering frame adapted to correctly position said adjusting means as the registering marks on the registering frame are brought into registration with the marks on the negative.

Another object of the invention is the provision of locating means on the registering frame which is adjustable for negatives of different thicknesses, or for a negative of varying thickness.

Still another object of the invention is the provision of means for correctly positioning the negative with respect to elements engaging on photocomposing machines in any direction in the plane of the negative and at substantially right angles thereto, such adjustment at substantially right angles being made when the negative is in contact with a cooperative portion on the registering frame, together with means for moving the registering frame out of contact with the negative prior to adjustments in the plane of the negative.

Other objects of the invention will be apparent from the following description taken in connection with the drawings, in which Fig. 1 is a top view of a negative holder, a registration frame, and the supporting table;

Fig. 2 is a top view of the registering frame and the supporting table with the negative frame removed;

Fig. 3 is a top view of the supporting table with the negative frame and the registering frame removed;

Fig. 4 is an edge view of Fig. 1;

Fig. 5 is a section on the line 5—5 of Fig. 1;

Fig. 6 is a section on the line 6—6 of Fig. 1;

Fig. 7 is a section on the line 7—7 of Fig. 1;

Fig. 8 is a section similar to a portion of Fig. 7 showing the registration table lowered with respect to the negative frame;

Fig. 9 is a section on the line 9—9 of Fig. 1; and

Figure 10:
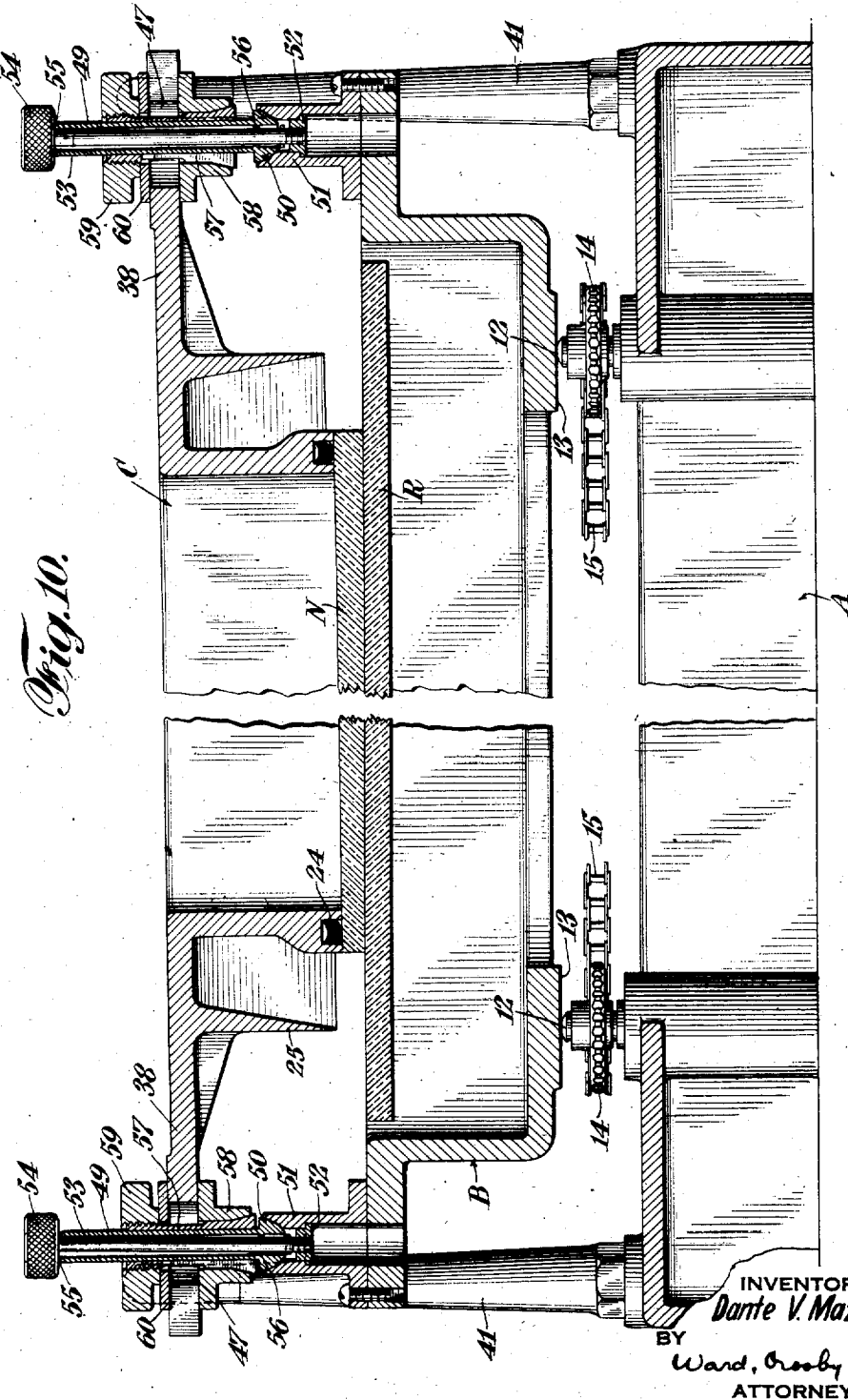
Fig. 10 is a section illustrating the position of the locating devices when the negative on the holder is of varying thicknesses.

The invention as illustrated in the drawings includes a supporting table A, a registering frame B and a negative frame C. The supporting table A may be of any suitable construction and as shown may be provided with four threaded sockets 11 arranged at the corners of a square to receive threaded studs 12, the upper ends of which bear on enlarged bearing surfaces 13 on the registering frame B for supporting the registering frame, and are preferably rounded so as to facilitate movement of the frame B on said studs during the registering operation.

Each stud carries a sprocket wheel 14, and by means of sprocket chain 15 passing about said wheels all of the studs 12 may be rotated simultaneously to raise or lower the registering frame B. The sprocket chain 15 is provided with a link carrying a stop projection 16 cooperating with a fixed stop 17 on the supporting table A against which it is drawn by means of a spring 18. When the chain is drawn into the position shown in Fig. 3, the threaded studs 12 are in the normal position supporting the registering frame B in the position in which contact is made between the negative N on the negative frame C and the registering glass plate R on the registering frame B, as the negative frame is placed on the apparatus. By means later described, the negative frame may be held in this position and then the chain 15 may be drawn clockwise by means of a handle 19 so as to lower the registering frame B to move the glass plate R out of contact with the negative N during adjusting operations of the registering frame B. The chain 15 may be held in this position by means of a manipulative member 19a which may be spring-pressed into engagement with the chain as indicated in Fig. 4. By means of this construction the negative plate may be brought into contact with the registering glass plate for the purpose of arranging the face of the negative parallel in effect with the upper face of the supporting table, and the metal press plate of a photocomposing machine. The registering glass plate may be held in the registering frame by means of plates 20 secured to the frame and against which the upper face of the plate may be moved by means of adjustable studs 21, as indicated in Fig. 5, after the plate has been adjusted to its proper position in the frame.

The negative N may be secured to the negative frame C, as shown in Fig. 5, by means of link hinged clips 22 whose beveled ends may be drawn into wedging engagement with the beveled lower edges of the negative N by means of an adjustable nut on the screw bolt 23, the link hinge operating to draw the negative toward the frame. As the negative N is drawn against the seat on the negative frame C it compresses a sealing ring 24, which is preferably of the shape shown in Fig. 5, to form an air-tight seal between the negative and the negative frame for the purpose of permitting a vacuum to be created between the negative N and the press plate in the composing machine, as will be understood. The negative frame C is also provided with a flange 25 which cooperates with a sealing ring to provide for the creation of vacuum between the negative and the press plate in the composing machine. The sealing ring has not been shown in this application as it has no function during the registering operation but is applied after the registration has been completed. The sealing ring 24 must, of necessity, be applied before the negative plate N is secured to the negative frame C, as the relation of these parts may not be disturbed after the registration operation has been completed.

As indicated in Fig. 2, the registration plate R is provided with two cross lines 32 and 37 intersecting at right angles and located centrally. Each negative N is provided with registration marks 31 and 36 placed on the negative by the artist to determine the final position and orientation of the image produced on the press plate in the composing machine.

The registering frame B, Fig. 2, is provided with projecting members 26 provided with substantially rectangular openings, the walls of which preferably carry hardened bearing plates 27 spaced apart to receive and cooperate with an eccentric 28 on a shaft 29 rotatably mounted in a bearing in the supporting table A. The upper end of the shaft 29 is provided with a knurled head 30 by means of which the shaft and the eccentric may be turned. As will appear obvious from Figs. 1 and 9, by turning the eccentric on the right hand end of Figs. 1 and 2 the right hand end of the registering frame B, as viewed in Fig. 1, may be raised or lowered swinging about the eccentric on the left hand end. Similarly, when the left hand side eccentric is turned the frame may be swung about the eccentric on the right hand side. By moving both of the eccentrics in the same direction the registering frame may be moved vertically, as viewed in Figs. 1 and 2. By means of this construction the center line 32 of the registration lines of the registration plate R may be aligned with the horizontal registration marks 36 on the negative N.

Each of the bearings which supports a shaft 29 is also provided with a threaded hole receiving an adjusting bolt 33 adapted to bear against a vertical bearing portion 34 on the registration frame B, which bolt is equipped with a finger nut 35 by means of which the bolt may be advanced or retracted to move the frame B horizontally, as is viewed in Figs. 1 and 2. The bolts are preferably adjusted simultaneously, or either bolt may be retracted sufficiently to permit the other one to be advanced to move the vertical cross line 37 on the registration plate R into alignment with the vertical marks 31 on the negative N.

The mechanism above described is for the purpose of registering the registration marks on the negative with the cross lines on the registering plate, the parts being such that when this has been done and the negative frame is placed in a photocomposing machine, such as described in my application Ser. No. 472,598, filed August 2, 1930, that the marks on the negative will be in alignment with the travel lines of the photocomposing machine.

The negative frame, which is preferably of rectangular construction to conform to the usual shapes of negative plates, is provided at each of its corners with a substantially diagonally extending flange 38 provided preferably with right angularly related edges 39 and 40 adapted to cooperate with posts 41 rigidly mounted on three corners of the supporting table, and with a pair of posts 42 adjustably mounted on the fourth corner of the supporting table. The posts 42 are supported on a member 43, Figs. 1 and 7, which may be moved by means of a screw bolt 44 supported in a bracket 45 pivoted for limited movement, as indicated, on the supporting table A. By means of a finger wheel 46 the posts 42 may be moved into engagement with the edges 39 and 40 of an extension 38 on the negative frame to move the remaining extensions 38 into contact with the respective posts, a pair of posts 41 being preferably located on the corner of the supporting table directly opposite to the pair of movable posts 42. The opposite pair of corners of the table are preferably provided with single posts 41. The member 43 and the posts 42 carried thereby may be moved into engagement with the edges 39 and 40 of the flange 38 by turning the finger wheel 46. Further turning of the finger wheel causes the posts 42 to exert a horizontal thrust on the vacuum frame causing the edges 39 and 40 of the other flanges 38 to frictionally engage the posts 41. The friction between the posts 41 and 42 and the edges 39 and 40 of the flanges 38 is sufficient to lock the frame C in position against downward movement when the registration frame B is subsequently lowered. If desired, the posts 41 and 42 may be knurled or otherwise roughened to bite into the edges of the vacuum frame, which is usually made of aluminum for the purpose of providing a light vacuum frame for facilitating handling.

Each of the extensions 38 on the negative frame is provided with a relatively large circular hole 47 and an entry slot 48. The hole is sufficiently large to permit of the necessary relative movement between a positioning sleeve 49 and the arms 38. The sleeve 49 is provided with a spherical lower end 50 adapted to seat in a corresponding seat in a seat member 51 on the registration frame B. The seat member 51 is provided with a threaded fixed nut 52 which receives the threaded end of a locking bolt 53 extending through the positioning sleeve 49 and provided with a finger portion 54 adapted to bear on the upper spherical end 55 of the positioning sleeve 49. The sleeve 49 is also provided with a circular internal rounded rib 56 which provides a bearing point on the locking bolt 53 permitting the sleeve and bolt to rock relatively, as indicated in Fig. 10, when the negative on the negative frame is of unequal thicknesses.

After the negative frame has been placed into position to move the negative N into contact with the registration plate R, the locking bolts 53 are operated by the finger nuts 54 to cause the nuts 54 to bear against the upper spherical ends 55 of the positioning sleeves 49, thereby locking the positioning sleeve with relation to the seats 51 on the registering frame B, so that the rounded ends 50 of the positioning sleeve 49 will be in position to register with the seats in the photocomposing machine corresponding to the seats 51 on the registering frame, to position the face of the negative parallel to the face of the press plate in the photocomposing machine.

After the locking bolts 53 have been tightened to hold the positioning sleeves in the seats 51, the registering frame may be lowered, as shown in Fig. 8, after which the registering frame is adjusted by means of the eccentrics until the line 32 on the registering plate coincides with the marks 36 on the negative. After this has been done the registration frame is moved horizontally, as viewed in Figs. 1 and 2, by means of the adjusting bolts 33 to bring the line 37 on the registering plate into alignment with the marks 31 on the negative. When this has been done the positioning sleeves have been moved into the positions in the openings 47 in the arms 38 which they are to occupy when the negative frame is mounted in the photocomposing machine, so as to bring the registering marks on the negative into alignment with the travel lines on the composing machine.

For the purpose of locking the positioning sleeves into adjusted position, each sleeve is preferably surrounded by a split clutch sleeve 57 which cooperates with a circular clutch sleeve 58 bearing on the lower face of the extension 38 against which it is drawn into tight contact by means of a knurled nut 59 threaded on the split clutch sleeve 57 and bearing on a washer 60 on the upper face of the arm 38 of the negative frame.

By means of the clutch sleeves 57 and 58 the positioning posts 49 are securely locked in the horizontal and vertical positions they assumed with respect to the negative frame C during the registration operation. As stated before, the photocomposing machine includes seats similar to those indicated at 51 in Fig. 10, so that when the negative frame is placed in the photocomposing machine the marks on the negative will coincide with the travel lines of the photocomposing machine and the face of the negative will be parallel with the press plate.

The posts 41 and 42 on the supporting table are preferably arranged at the corners of a square as are also the cooperating edges 39 and 40 of the rectangular negative frame C. The upper ends of the posts are preferably cylindrical to cooperate properly with the edges 39 and 40 for negatives of different thicknesses. It is obvious, of course, that the edges 39 and 40 could be arcuate and continuous or of any other desired shape, and that other means could be employed to center the negative frame with respect to the supporting table and to hold it centered and at the proper distance from the supporting table as determined by the thickness of the negatives employed. The construction should be such as to support the face of the negative in exact parallel relation to the cooperating face of the registering plate when the latter is lowered prior to effecting registration.

The seats 51 on the registering frame B are preferably arranged at the corners of a square as are also the corresponding seats in the photocomposing machine. The lines 32 and 37 on the registration plate are placed exactly midway between these seats 51 when the plate is assembled on its frame and before the screw bolts 21 are advanced to hold the plate in position. By arranging the lines as described, I am enabled to obtain proper registration of the negative with the travel lines of the photocomposing machines in any of the ninety degree (90°) angular positions of the negative frame in the photocomposing machine.

The seating faces in the seat members 51 are preferably spherical to receive the spherical ends 50 of the positioning posts 49 in order that the posts may properly seat in the seats 51 on the registration frame and on corresponding seats in a photocomposing machine when the negative is of unequal thickness, or tapered as shown in Fig. 10. The diametral dimensions of the locking bolts and interior of the positioning sleeves or posts permit the posts to tilt with the negative frame while permitting the locking bolts to remain in their true vertical position for engagement with the nuts 52 in the seats 51 and corresponding nuts on the photocomposing machine. The relation of the lower ends of the posts and locking bolts is maintained by the rib 56 on the interior of the posts.

While the invention has been described with reference to the single embodiment illustrated, it is to be understood that terms imported from the specification into the claims are to be considered descriptive and not limiting, and that it is the intention to cover all equivalent forms of this invention. In particular, the term "negative" is to be construed broadly as covering all equivalents such as positives, and every form of image bearing plate or the like that may be employed in a composing machine or the like in which preregistration is desirable, or necessary.

What I claim is:

1. In a registering apparatus the combination of a supporting table, means for movably supporting a registering frame thereon, means for fixedly supporting a negative frame thereon, means slidably mounted on said negative frame and fixedly mounted on said registering frame, means for adjusting said registration frame to register marks on said frame with marks on said negative frame, said means operating to position said slidable means with respect to said negative frame, and means for clamping said slidable means in adjusted position on said negative frame.

2. In a registering apparatus the combination of a supporting table, and means for positioning a negative frame in spaced relation thereto, said means including a pair of positioning posts fixedly mounted on one corner of said supporting table, and a pair of positioning posts adjustably mounted on the opposite corner of said supporting table.

3. In a registering apparatus the combination of a supporting table, means for positioning a negative frame in predetermined relation thereto, said means including a pair of positioning posts fixedly mounted on one corner of said supporting table, a pair of positioning posts adjustably mounted on the opposite corner of said supporting table, and projections on said negative frame, each provided with non-parallel side edges cooperating with said pairs of positioning posts.

4. In a registering apparatus the combination of a supporting table, means for positioning a negative frame in predetermined relation thereto, said means including a pair of positioning posts fixedly mounted on one corner of said supporting table, and a pair of positioning posts adjustably mounted on the opposite corner of said supporting table, projections on the four corners of said negative frame, each provided with non-parallel side edges, the side edges of two opposite projections cooperating with said pairs of positioning posts, and posts on the other pair of opposite corners on said supporting table cooperating with the side edges of projections on corresponding opposite corners of said frame.

5. In a registering apparatus, the combination of a supporting table, a negative frame, means for supporting said negative frame in predetermined relation to said table, a registration frame supported on said supporting table for movement in the plane of the frame, slotted extensions on opposite ends of said registration frame, eccentrics operating in said slotted extensions for moving the frame angularly or in the direction of one of its dimensions, and adjustable screw bolts mounted in said supporting table and bearing on said registering frame for moving said registering frame in the direction at right angles to said first mentioned direction.

6. In a registering device the combination of a supporting table, a negative frame, means for supporting said negative frame in predetermined relation to said supporting table, a registration frame mounted on said supporting table for movement in its plane, semi-spherical seats carried by said registration frame, positioning posts slidably carried by said negative frame and provided with semi-spherical ends engaging said semi-spherical seats, means for locking said positioning posts to said seats, means for adjusting said registration frame and said positioning posts with respect to said negative frame, and means for locking said positioning posts to said negative frame in their adjusted position.

7. In a registering device the combination of a supporting table, a negative frame, means for supporting said negative frame in predetermined relation to said supporting table, a registration frame mounted on said supporting table for movement in its plane, semi-spherical seats carried by said registration frame, tubular positioning posts slidably carried by said negative frame and provided with upper semi-spherical ends and also with lower semi-spherical ends engaging said semi-spherical seats, a threaded locking bolt extending through each of said hollow positioning posts and provided with a head engaging the upper semi-spherical end of said positioning post, means formed interiorly in said sleeve bearing against said tightening bolt to hold the lower end in substantially the same relation to said semi-spherical seat while permitting the upper end to move with respect to said hollow positioning post, means for locking said positioning posts to said seats, means for adjusting said registration frame and said positioning posts with respect to said negative frame, and means for locking said positioning posts to said negative frame in their adjusted position.

8. The combination with a negative plate holder, a plurality of means each laterally and vertically adjustable on said holder for controlling the position of a negative in a photocomposing machine.

9. The combination with a negative plate holder, a plurality of means each laterally and vertically adjustable on said holder for controlling the position of a negative in a photocomposing machine, and means for locking said first mentioned means in laterally and vertically adjusted positions.

10. The combination with a negative plate holder, of means for controlling the positioning of the face of a negative plate in said holder in a plane parallel to the face of a press plate in a photocomposing machine, comprising a plurality of elements adapted for cooperation with elements of a photocomposing machine and adjustably mounted on said plate holder for movement transversely of the plane of the negative plate.

11. The combination of a supporting table, means for rigidly supporting a negative carrying frame on said table, adjustable locating means on said negative frame, a registration device on which said adjustable means is supported, and means for moving said registration device to position said locating means to register a negative in said negative frame with respect to the travel lines of a photocomposing machine.

12. The combination of a supporting table, a negative frame supporting a negative provided with registration marks, means rigidly supporting said frame on said table, a registration frame supporting a registration plate provided with registration lines, means for adjusting said registration frame to align said lines and marks, and means on said negative frame adjustable by said registration frame into positions to control the registration of marks on said negative with the travel lines in a photocomposing machine.

13. The combination of a supporting table, a negative carrying frame, means for rigidly supporting said frame at varying distances from said table, a registration carrying frame located between said table and negative carrying frame and supported on said table for relative movement to said table and negative carrying frame, and adjustable positioning devices on said negative carrying frame movable with said registration frame.

14. The combination of a negative carrying frame, universally adjustable positioning devices thereon provided with spherical seating portions, registration means including spherical seating portions cooperating with said spherical seating portions on said devices for adjusting said devices, a common support for said movable registration means, and means for supporting said common support for movement with respect to said negative frame.

15. The combination with a negative carrying frame, positioning posts extending from one side of said frame for supporting said frame in a photocomposing machine, and adjustable connections between said posts and frame permitting adjustment of said posts in any direction in the plane of said frame and at right angles thereto.

16. The combination of a registration frame, a negative carrying frame arranged close to and parallel with said registration frame, positioning means adjustable on said negative carrying frame, fixed means on said registration frame arranged at the corners of a square and engaging said positioning means for adjusting the same on said negative carrying frame upon movement of said registration frame, and registration devices on said registration frame located exactly midway between said fixed means on each side of said square.

17. The combination of a negative carrying frame, means for rigidly supporting said frame, adjustable positioning devices on said frame, a registration frame arranged close to and parallel with said negative carrying frame, means for movably supporting said registration frame, means located at the corners of a square on said registration frame and rigidly secured thereto and interengaging with said devices for moving and positioning said devices upon movement of said registration frame, and registration means carried by said frame located exactly midway between said first mentioned means on each side of said square.

18. In a registering apparatus, the combination of a supporting table, a negative frame, means for securing said negative frame in spaced relation to said table, a registering frame, means supporting said registering frame between said table and negative frame for movement of said registering frame in any direction in the plane of said registering frame and toward and away from said negative frame, negative frame positioning devices removably held in fixed position on said registering frame and projecting through said negative frame for universal movement with respect to said frame, and means for locking said positioning devices to said negative frame in adjusted position.

19. The combination of a negative plate holder, a plurality of supporting means for said holder mounted for relative movement with respect thereto, means for relatively adjusting said supporting means and said holder for positioning a negative plate in said holder with respect to the travel lines of a photocomposing machine, and means also for adjusting said supporting means with respect to said holder for positioning the face of a negative carried by said holder in a plane parallel to the plane of the press plate in a photocomposing machine.

DANTE V. MAZZOCCO.